United States Patent

Von Holst et al.

[11] Patent Number: 5,487,626
[45] Date of Patent: Jan. 30, 1996

[54] THREADING TAP

[75] Inventors: Peder Von Holst, Sandviken, Sweden; Josef Giessler, Mühlenbach, Germany

[73] Assignee: Sandvik AB, Sandviken, Sweden

[21] Appl. No.: 301,608

[22] Filed: Sep. 7, 1994

[30] Foreign Application Priority Data

Sep. 7, 1993 [SE] Sweden .................. 9302885

[51] Int. Cl.⁶ .................................. B23G 5/06
[52] U.S. Cl. .................. 408/144; 408/222; 470/198
[58] Field of Search .................. 408/144, 222; 470/198

[56] References Cited

U.S. PATENT DOCUMENTS

| | | | |
|---|---|---|---|
| 2,240,840 | 5/1941 | Fischer | 408/144 |
| 2,351,827 | 6/1944 | McAllister | 408/222 |
| 3,328,814 | 7/1967 | Hudson | 470/198 |
| 4,145,213 | 3/1979 | Oskarsson et al. | 75/238 |
| 4,618,540 | 10/1986 | Von Holst et al. | 428/552 |
| 4,708,542 | 11/1987 | Emanuelli | 408/144 |

FOREIGN PATENT DOCUMENTS 122176 10/1984 European Pat. Off. .

OTHER PUBLICATIONS

VDI Zeitschrift, vol. 215, Sep. 1993, Dusseldorf DE, p. 28, XP392754, "Hochgeschwindigkeits–Gewindebohren".

Tooling and Production, vol. 51, No. 10, Jan. 1985, Solon US, "No Holes Barred".

Werkstatt und Betrieb, vol. 117, No. 5., May 1984, Munchen DE, pp. 273–276, Woska, "Einsatz titannitrid–beschichteter Gewindebohrer".

*Primary Examiner*—Steven C. Bishop
*Attorney, Agent, or Firm*—Burns, Doane, Swecker & Mathis

[57] ABSTRACT

A threading tap comprises a cylindrical shaft and a threading portion. At least the threading portion comprises a compound material comprising a core of high speed steel or tool steel and a cover of "Coronite"®, i.e., a hard material with 30 to 70% by volume of submicronic hard materials in the form of carbides, nitrides and/or carbonitrides of Ti, Zr, Hf, V, Nb, Ta, Cr, Mo and/or W in a metallic matrix based on Fe, Co and/or Ni. The chip surfaces adjacent to the cutting edges of the cutting threads have a negative rake angle. The threading tap has proven to be excellent at the threading of titanium-based alloys.

6 Claims, 1 Drawing Sheet

THREADING TAP

BACKGROUND OF THE INVENTION

The present invention relates to a threading tap for cutting threads in primarily titanium and titanium-based metal alloys, comprising an elongate shaft of a metallic compound material, which at one end is provided with two or more lands preferably extending helically around the central axis of the tap, which lands on their envelope surfaces are provided with cutting threads of similar profile and which are separated by equally helically twisted chip flutes.

Threads are produced by chip-cutting or plastic forming methods. Threading by threading taps belongs to the chip-cutting methods. One may use either ready taps or series taps, depending upon the hardness and cutting data of the workpiece. Using ready taps, the thread is made by one single tap while using series taps, several taps are used in sequence for obtaining a ready thread.

Threading taps are normally made of high speed steel (HSS). In order to improve their function, HSS threading taps have sometimes been subjected to some sort of surface treatment. The most common surface treatments are steam tempering, nitration and coating with TiN. These treatments contribute to the counteracting of built-up edges, the increasing of surface hardness and wear strength and to lowering the friction. In spite of this, it has often turned out to be difficult to attain satisfactory threading in some difficult to machine materials. In particular, in tough materials such as titanium and titanium-based alloys, the usual threading taps of HSS have demonstrated unsatisfactory tool lives. Also, the quality of the thread has often been inadequate, which is caused by portions of the relatively tough material being stuck upon the threading tap, in particular at low cutting speeds. Such inconveniences are, of course, particularly aggravating in technical fields with highly strict safety requirements as in the aircraft industry.

OBJECTS AND SUMMARY OF THE INVENTION

It is an object of the present invention to avoid or alleviate the problems of the prior art.

It is further an object of the present invention to provide a threading tap with an increased tool life in tough materials, such as titanium-based alloys, in comparison with previous threading taps.

Another object of the present invention is to provide a threading tap which makes possible an efficacious threading without any material being stuck on the tap also at low cutting speeds.

Still another object of the present invention is to provide a threading tap which makes possible increased cutting data.

A further object of the present invention is to provide a threading tap which can easily be bored away at a possible tool breakdown.

In one aspect of the invention there is provided a threading tap comprising an elongate, substantially cylindrical shaft, which at one is provided with two or more lands which are straight or helically twisted around the central axis of the shaft, which lands are provided with cutting threads of substantially equal profiles and which are separated by straight or equally twisted chip-conveying flutes, at least the portion of the threading tap provided with lands comprising a core of high speed steel or tool steel and a cover of a hard material of 30 to 70% by volume of submicronic hard materials of carbides, nitrides and/or carbonitrides of Ti, Zr, Hf, V, Nb, Ta, Cr, Mo and/or W in a metallic matrix based on Fe, Co and/or Ni, the chip surfaces adjacent to the cutting edges of the cutting threads having a negative rake angle.

In another aspect of the invention there is provided the use of the threading tap for threading of holes in titanium and titanium-based alloys.

BRIEF DESCRIPTION OF THE DRAWINGS

For illustrative but non-limiting purposes, a preferred embodiment of the invention will now be described with reference to the appended drawing, in which.

DETAILED DESCRIPTION OF THE PREFERRED EMBODIMENTS OF THE INVENTION

Figure 1:
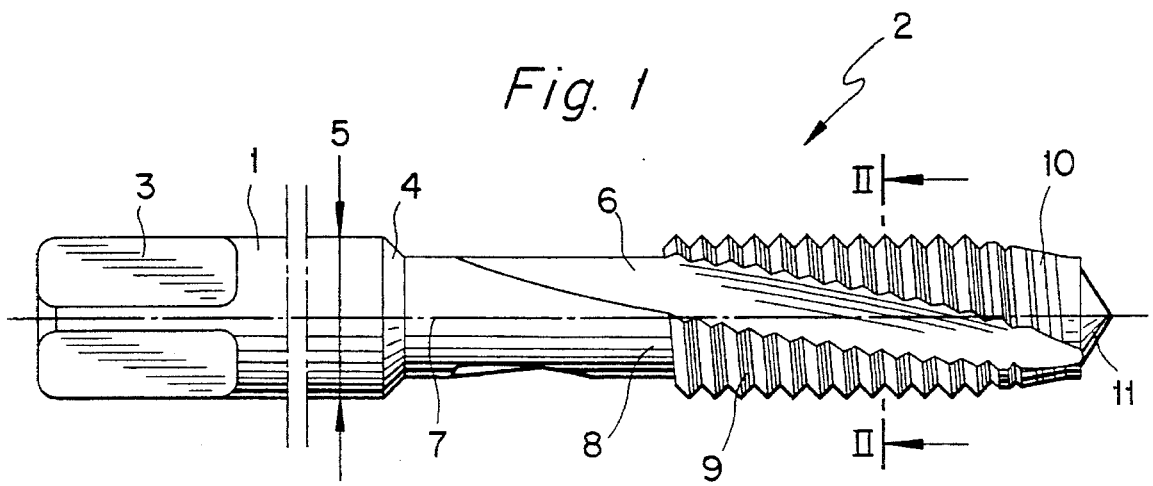
FIG. 1 shows a straight frontal view of the threading tap according to the invention.

In FIG. 1, a threading tap according to the present invention is shown, a part of the uniform shaft having been cut away. At the front portion of the threading tap is the operative threading portion 2. At least this portion 2, however preferably the whole threading tap, is made of a metallic compound material which will now be further described.

By the term "compound material" is meant a composite product with different materials in different parts. According to the present invention, the compound material consists of a composition according to U.S. Pat. No. 4,618,540 which has been prepared by the process as described in said patent specification. Thus, the inner core of the threading tap, of a substantially circular cross-section, consists of high speed steel or tool steel, preferably of the latter. Outside this core there is a cover whose thickness normally amounts to 10 to 20%, preferably about 15%, of the diameter of the tool (however, preferably at least 0.5 mm), which cover is made of a specific hard material as described in U.S. Pat. No. 4,145,213. This hard material, normally named "Coronite"®, contains 30 to 70% by volume of submicronic hard materials in the form of carbides, nitrides and/or carbonitrides of Ti, Zr, Hf, V, Nb, Ta, Cr, Mo and/or W in a metallic matrix based on Fe, Co and/or Ni. Preferably, this hard material consists of 30 to 70% by volume of hard materials of mainly TiN in a matrix of HSS-type in which the enriched hard materials have a grain size of <1 µm, preferably <0.5 µm.

Preferably, the threading tap is used with at least the operative portion 2 coated with a suitable coating material, which further prolongs the tool life. Because of its fine grain size and good dispersion of the hard materials in the binding phase, the cover of hard material has an exceptionally good adhesion to pure coatings of hard materials which have been deposited by the so-called PVD (Physical Vapor Deposition) process. Normally, this process gives a lesser adhesion in comparison with the more metallurgical binding that is created at the so-called CVD (Chemical Vapor Deposition) process. The reason for this is mainly that CVD takes place at higher temperatures. The layers being deposited are mainly based on titanium and particularly good properties have been attained with TiN, Ti(C,N) and (Ti,Al)N. Particularly fine properties have been obtained with 2 to 4 µm Ti(C,N).

Returning to the geometrical shape of the tool, the rear portion of the shaft 1 is formed to be fastened in a chuck, bushing or similar. Thus, according to the illustrated embodiment, this end has been provided with four plane chafers 3 which jointly form a substantially square cross-section with rounded corners. Shaft portion 1 with the diameter 5 transposes into the narrower, operative threading portion 2 via a step or dimension transition 4. Alternatively, the threading tap may be formed uniformly thick, without any change of diameters. The operative threading portion 2 is formed with two or more chip-conveying flutes 6, which may be straight in an axial direction, but are preferably helically twisted around the central axis 7 of the threading tap, substantially equally formed, and located substantially equidistantly. Preferably, the tool comprises between two and five such flutes, preferably three. The pitch angle of the flutes may lie between −25° and +25°, preferably between +12° and +18°, at a positive pitch, and between 0° and −15° at negative (neutral at 0) pitch. Between these flutes or grooves 6 are protruding lands 8, on whose rounded, peripheric envelope surface are formed threads 9. Suitably, these correspond to any of the normal standards, i.e., threads between M4 and M12. However, this is not an essential feature of the present invention and other threads may be used. At its front end, the threading tap is formed with a cutting chamfer 10, in order to ease the entering into a pre-drilled core hole in a workpiece. Suitably, the length of the cutting chamfer varies between 2 and 8 leads, depending inter alia upon whether through or bottomed holes are to be threaded. According to the illustrated embodiment, the threading tap is finished at its front end by a conical point, which however, may also be disposed of.

Figure 2:
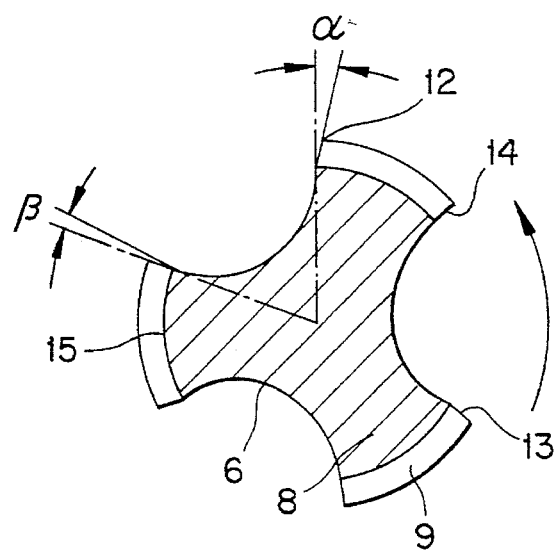
FIG. 2 shows the cross-section II—II in FIG. 1.

The threading tap may be threading either to the right or to the left. In FIG. 2, a left-threading tap is shown. Further, the chip-flutes may be either straight or twisted, and if twisted, twisted either in same direction as the direction of rotation or in the opposite direction. When the flutes are twisted in a direction opposite the direction of rotation, then the flutes become chip-driving, i.e., they convey the chips in front of the threading rap, and thereby diminish the risk for chip jamming during the reversion, i.e., when the tap is reverse rotated for removal from the hole. This construction is used for threading through holes. On the other hand, if the chip-flutes are twisted in the same direction as the direction of rotation, then the chips are forced backwards and out of the hole. This embodiment is primarily suitable for holes with a bottom.

The toothed break line between a chip-flute and the front edge of a land, in the direction of rotation, forms the cutting edge 12. It is an essential feature of the present invention that the chip face 13 adjacent to the cutting edge is negative and has a negative rake angle $\alpha$. This angle is measured between the negative chip face 13 and a radius touching the break line between said chip face and the curved surface of the chip-flute. The negative chip surface should preferably extend from the thread tops of cutting edge 12 toward the central axis of the threading tap, at least to a distance that corresponds to the depth of the thread profile, i.e., to the line 15 as may be seen in FIG. 2. The negative chip angle $\alpha$ may lie between −4° and −14°, suitably between −6° and −12°, and preferably between −8° and −10°.

The clearance surface 14, which is situated behind each land 8 in the direction of rotation and forms an angle $\beta$ with a radius that intersects a line 15 corresponding to the depth of the thread profile, is not critical for the present invention and may be varied within relatively wide limits. For instance, an angle $\beta$ between −5° and +5° may be chosen, suitably between −3° and +3°.

The combination of a special compound material and a negative chip geometry brings about several advantages. In particular, threading taps according to the present invention have a surprisingly long tool life for threading of cored holes in titanium and titanium-based metallic alloys, particularly for those alloys which have treated under HIP conditions (HIP stands for High Isostatic Pressure and tells that the workpiece has been condensed at high pressure and high temperature) before threading.

The invention is additionally illustrated in connection with the following Example which is to be considered as illustrative of the present invention. It should be understood, however, that the invention is not limited to the specific details of the Example.

EXAMPLE

The following comparative tests were made between a threading tap according to the present invention and normal threading tap of high speed steel (HSSE) with a positive rake angle:

Workpiece: Titanium alloy $TiAl_6V_4$, with a tensile strength of 1150 $N/mm^2$

Predrilled core hole diameter: 5 mm

Made thread: M6

Hole depth (hole with bottom): 12 mm

Cooling liquid: cutting oil, vertically

Cutting speed: HSSE: 2 m/min

Threading tap according to the invention: 5 m/min

Number of threaded holes with HSSE: 60

Number of threaded holes by a threaded tap according to the invention: 640

Thus, more than a tenfold increase of the number of threaded holes, and moreover, at a higher cutting speed. This results in several obvious advantages, such as decreased tool costs and shortened downtimes at tool changes. Moreover, the threading tap according to the present invention cuts more nearly and without any sticking material from the workpiece, which means that the tap does not bind in the threaded hole after the threading, and that the threading tap may be reversed by hand, if desired.

A comparison was also made with a threading tap of the same compound material that was used in the threading tap according to the present invention, but with the usual positive rake angle used in HSS taps. Tests in the same titanium alloy demonstrated that such a threading tap was broken already after a small number of holes.

In those cases where only the operative threading portion 2 is made of the special compound material according to the present invention, this portion can be welded upon a shaft portion 1. The shaft portion may then be made of another suitable material, such as tool steel.

Thus, the threading tap according to the present invention has demonstrated excellent results with increased cutting data at different applications in titanium-based alloys. Moreover, the tool has proven to be surprisingly capable also in other smeary materials, such as aluminum and aluminum-based alloys.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A threading tap comprising an elongate, substantially cylindrical shaft, which at one is provided with two or more lands which are straight or helically twisted around the central axis of the shaft, which lands are provided with cutting threads of substantially equal profiles and which are separated by straight or equally twisted chip-conveying flutes, at least the portion of the threading tap provided with lands comprising a core of high speed steel or tool steel and a cover of a hard material of 30 to 70% by volume of submicronic hard materials of carbides, nitrides and/or carbonitrides of Ti, Zr, Hf, V, Nb, Ta, Cr, Mo and/or W in a metallic matrix based on Fe, Co and/or Ni, the chip surfaces adjacent to the cutting edges of the cutting threads having a negative rake angle between −6° and −12°.

2. The threading tap of claim 1 wherein the shaft is provided with 2 to 5 lands.

3. The threading tap of claim 1 wherein the shaft is provided with 3 lands.

4. The threading tap of claim 1 wherein at least part of the outer surface of the threading tap is coated with a thin layer of TiN, Ti(C,N) and/or (Ti,Al)N.

5. Use of the threading tap of claim 1 for threading of holes in titanium and titanium-based alloys.

6. The threading tap of claim 1 wherein the negative rake angle is between −8° and −10°.

* * * * *